United States Patent
Hieb

(10) Patent No.: US 9,934,659 B2
(45) Date of Patent: Apr. 3, 2018

(54) OUTDOOR MESSAGING DISPLAY FOR HOME AUTOMATION/SECURITY SYSTEMS

(71) Applicant: EchoStar Technologies L.L.C., Englewood, CO (US)

(72) Inventor: Eric Hieb, Parker, CO (US)

(73) Assignee: EchoStar Technologies International Corporation, Englewood, CO (US)

( * ) Notice: Subject to any disclaimer, the term of this patent is extended or adjusted under 35 U.S.C. 154(b) by 0 days.

(21) Appl. No.: 15/201,114

(22) Filed: Jul. 1, 2016

(65) Prior Publication Data
US 2018/0005495 A1    Jan. 4, 2018

(51) Int. Cl.
  G08B 5/22    (2006.01)
  H04L 12/28    (2006.01)
  G08B 13/196    (2006.01)
  G08B 13/19    (2006.01)

(52) U.S. Cl.
  CPC ....... *G08B 5/228* (2013.01); *G08B 13/19682* (2013.01); *G08B 13/19684* (2013.01); *H04L 12/2825* (2013.01); *H04L 2012/2841* (2013.01)

(58) Field of Classification Search
  CPC .............. G08B 5/228; G08B 13/19682; G08B 13/19684; H04L 12/2825
  USPC .................................... 340/539.11
  See application file for complete search history.

(56) References Cited

U.S. PATENT DOCUMENTS

| | | |
|---|---|---|
| 4,901,461 A | 2/1990 | Edwards et al. |
| 5,210,520 A | 5/1993 | Housley |
| 5,657,380 A | 8/1997 | Mozer |
| 5,781,108 A | 7/1998 | Jacob et al. |
| 5,790,019 A | 8/1998 | Edwin |
| 6,434,158 B1 * | 8/2002 | Harris ............ G06Q 20/40 235/472.01 |
| 6,438,221 B1 | 8/2002 | Lee et al. |
| 7,085,361 B2 | 8/2006 | Thomas |
| 7,123,142 B2 | 10/2006 | Bohbot et al. |
| 7,336,158 B2 | 2/2008 | Lombardo |
| 7,738,917 B2 | 6/2010 | Ryley et al. |
| 7,746,223 B2 * | 6/2010 | Howarter ............ G08B 3/10 340/13.31 |
| 7,796,024 B2 | 9/2010 | Lynn et al. |
| 8,154,581 B2 | 4/2012 | Carter |
| 8,164,614 B2 | 4/2012 | Carter |
| 8,760,270 B2 | 6/2014 | Lee et al. |

(Continued)

FOREIGN PATENT DOCUMENTS

| | | |
|---|---|---|
| WO | 2010/115231 A1 | 10/2010 |
| WO | 2012/058948 A1 | 5/2012 |

Primary Examiner — Omar Casillashernandez
(74) Attorney, Agent, or Firm — Kilpatrick Townsend & Stockton LLP

(57) ABSTRACT

An outdoor messaging display for a home automation system can include an arrival detection device for detecting a visitor's arrival. The system can also include a display device attached near a door that is capable of displaying text to the visitor. The system can also include a home automation controller that can receive a notification from the arrival detection device indicating that a visitor has arrived or has been detected. The home automation controller can send an alert to a device of the resident indicating that the visitor has arrived or been detected. The home automation controller can receive a message from the resident and output the message to the output display for the visitor to read.

20 Claims, 7 Drawing Sheets

(56) References Cited

U.S. PATENT DOCUMENTS

| | | |
|---|---|---|
| 8,780,201 B1 | 7/2014 | Scalisi et al. |
| 8,941,736 B1 | 1/2015 | Scalisi |
| 9,118,819 B1 | 8/2015 | Scalisi et al. |
| 2004/0229569 A1* | 11/2004 | Franz .................. H04M 3/16 455/66.1 |
| 2007/0032221 A1* | 2/2007 | Badt, Jr. .............. H04L 63/10 455/410 |
| 2007/0042804 A1 | 2/2007 | Ryley et al. |
| 2008/0196083 A1 | 8/2008 | Parks et al. |
| 2009/0222512 A1 | 9/2009 | Mohler |
| 2012/0182382 A1* | 7/2012 | Serramalera ........... H04N 7/147 348/14.07 |
| 2013/0045763 A1 | 2/2013 | Ruiz |
| 2013/0057695 A1* | 3/2013 | Huisking ............... H04N 7/186 348/156 |
| 2014/0210590 A1* | 7/2014 | Castro ................ G07C 9/00563 340/5.52 |
| 2015/0161856 A1 | 6/2015 | Wilson et al. |
| 2017/0169635 A1* | 6/2017 | Karlupia ................ G06Q 10/00 |

* cited by examiner

OUTDOOR MESSAGING DISPLAY FOR HOME AUTOMATION/SECURITY SYSTEMS

BACKGROUND OF THE INVENTION

In various instances, a resident of a home is unable or unwilling to answer the door when a visitor arrives. For example, a visitor may be an unwanted solicitor. In some cases, the resident is not expecting a visitor and does not want to answer the door for fear that the visitor is unwanted or even dangerous. In some cases, the resident is unable to answer the door because he or she is busy with a task that cannot be easily left or the resident is not home and is therefore unable to answer the door. However, in any of these instances there may be various reasons for wanting to provide some response to the visitor. There is a need for an easy way to respond to a visitor despite an inability or unwillingness to physically answer the door.

BRIEF SUMMARY OF THE INVENTION

To address the above described existing needs, systems and methods are described herein that provide an outdoor messaging display for home automation and security systems. The system can include an arrival detection device for detecting a visitor's arrival. The system can also include a display device attached near a door that is capable of displaying text to the visitor. The system can also include a home automation controller that can receive a notification from the arrival detection device indicating that a visitor has arrived or has been detected. The home automation controller can send an alert to a device of the resident indicating that the visitor has arrived or been detected. The home automation controller can receive a message from the resident and output the message to the output display for the visitor to read.

Optionally, the message displayed on the output display device can include a coupling code for the visitor to use with the visitor's mobile device. The home automation controller can receive a visitor message from the visitor's mobile device via the coupling code. The home automation controller can send the first visitor message to the resident's device. The home automation controller can receive a second output message from the resident's device in response to the first visitor message. The home automation controller can send the second output message to the mobile device of the visitor via the coupling code and/or to the display device.

Optionally, the arrival detection device can be a doorbell, a motion detector, or a proximity sensor. Optionally, the display device can be a light emitting diode (LED) display device, a liquid crystal display (LCD) device, a cathode ray tube (CRT) display device, or a plasma display device. Optionally, the device of the resident can be remote from the premises. For example, the device can be a mobile device carried with the resident while away from home. Optionally, the device of the resident can be a television within the premises.

Optionally, the alert to the device of the resident can include one or more predefined responses for selection by the resident. Optionally, the alert to the device of the resident can be sent via short message service (SMS). Optionally, the display device can include a keyboard that the visitor can use to send a message to the resident. The home automation controller can receive the message from the visitor and send the message from the visitor to the resident's device.

DETAILED DESCRIPTION OF THE INVENTION

At times, a resident of a home or business may be unable or unwilling to physically answer a door. For example, the resident may not be home. In some cases, the current occupant or resident of the home may be under 18 and be unwilling to let a visitor know that he or she is home alone. In some cases, the resident may not want to physically answer the door because he or she is concerned that the visitor may be an unwanted solicitor or even a dangerous visitor. Any number of reasons could exist for resistance to physically answering a door. However, providing a message to a visitor via a text display could allow a resident to get more information on the visitor or provide deterrence without physically answering the door. For example a text message display can provide deterrence for dangerous visitors or unwanted solicitors. A message to an unwanted solicitor saying "no thanks, I'm not interested" without the solicitor having the opportunity to try to persuade the resident to talk can be an effective way to dissuade the solicitor. If a resident is not home, but an unexpected visitor arrives, a message on a text display suggesting someone is home, by for example asking who is there, could dissuade the visitor from any dangerous activity, such as burglary. If a resident is home that is under 18, a text displayed message can conceal from the visitor that the current occupant is young.

Figure 1:
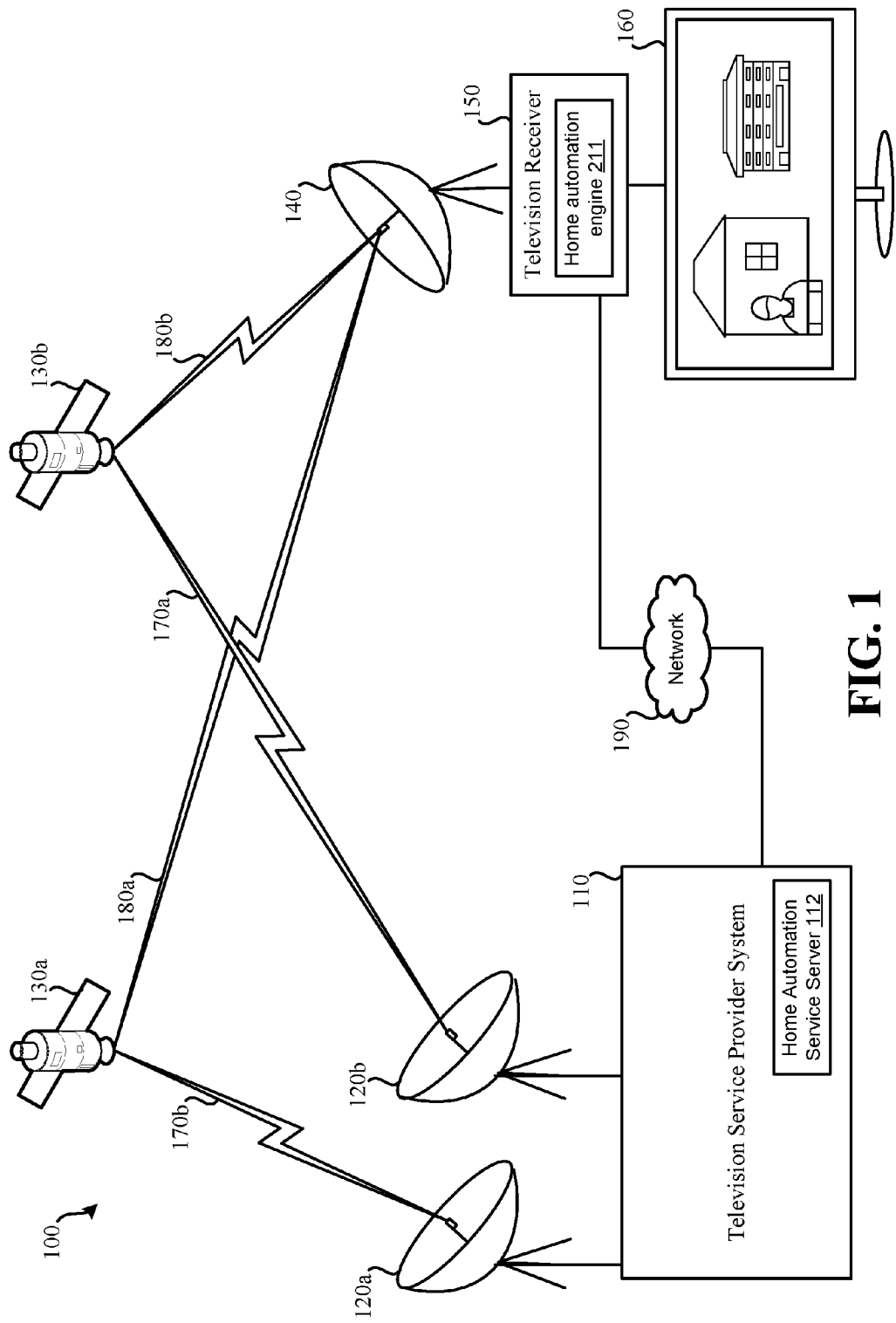
FIG. 1 illustrates an embodiment of a television service provider system that provides home automation functionality.

FIG. 1 illustrates an embodiment of a satellite television distribution system 100. While a home automation system may be incorporated with various types of television receivers, various embodiments may be part of a satellite-based television distribution system. Cable, IP-based, wireless, and broadcast focused systems are also possible. Satellite television distribution system 100 may include: television service provider system 110, satellite transmitter equipment 120, satellites 130, satellite dish 140, television receiver 150, home automation service server 112, and display device 160. The display device 160 can be controlled by, for example, a user using a remote control device that can send wired or wireless signals to communicate with the STB 150 and/or display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions of) instances and types of user equipment may receive data and television signals from television service provider system 110 via satellites 130.

Television service provider system 110 and satellite transmitter equipment 120 may be operated by a television service provider. A television service provider may distribute television channels, on-demand programming, programming information, and/or other content/services to users. Television service provider system 110 may receive feeds of one or more television channels and content from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from downlink signals 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed. Further, information used by television receiver 150 for home automation functions may also be relayed to a television receiver via one or more transponder streams.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130a. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

Figure 2:
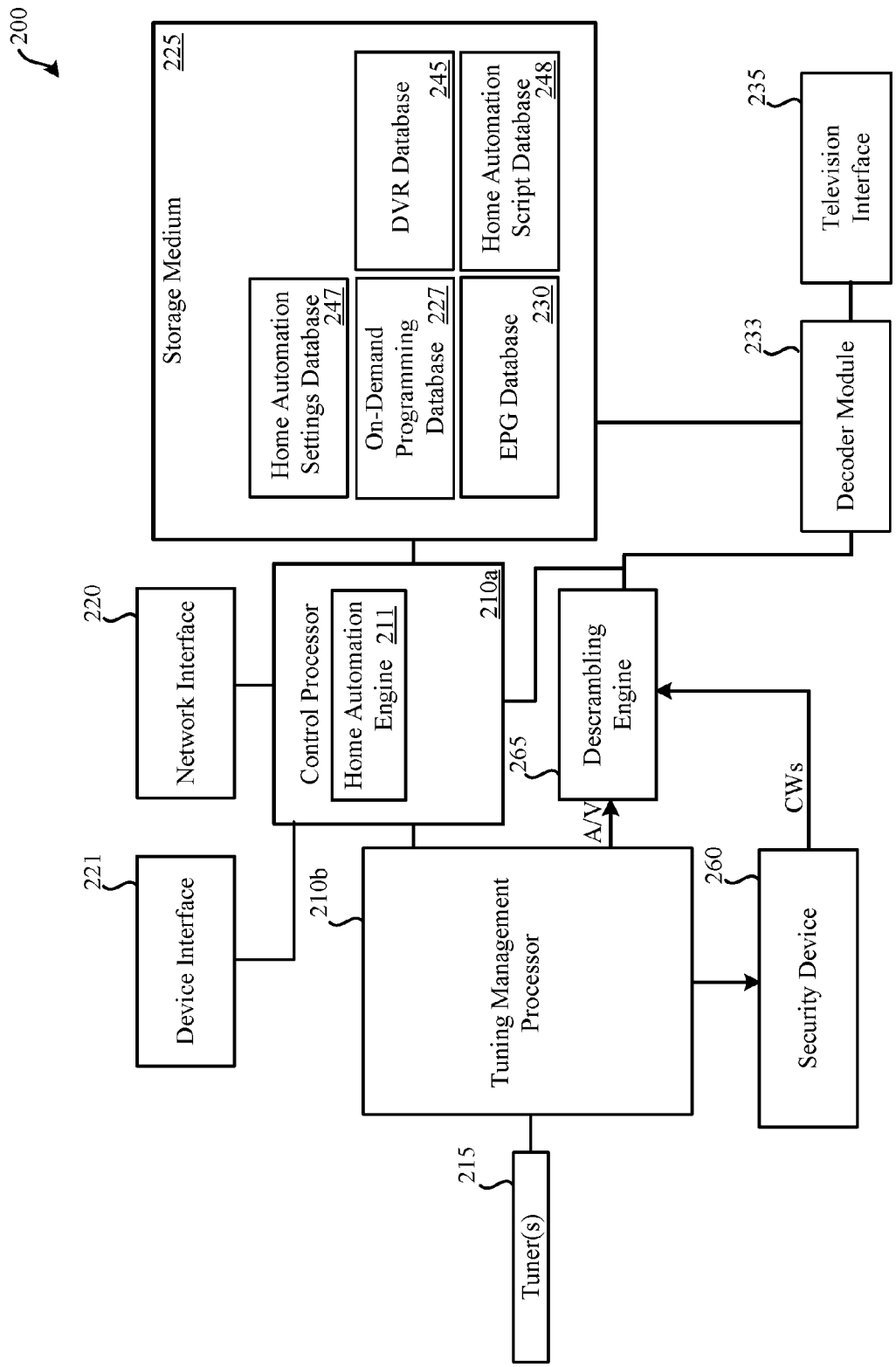
FIG. 2 illustrates an embodiment of a television receiver that functions as a host controller for a home automation system.

In communication with satellite dish 140 may be one or more television receivers. Television receivers may be configured to decode signals received from satellites 130 via satellite dish 140 for output and presentation via a display device, such as display device 160. A television receiver may be incorporated as part of a television or may be part of a separate device, commonly referred to as a set-top box (STB). Television receiver 150 may decode signals received via satellite dish 140 and provide an output to display device 160. On-demand content, such as PPV content, may be stored to a computer-readable storage medium. FIG. 2 provides additional detail of various embodiments of a television receiver. A television receiver is defined to include set-top boxes (STBs), and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160. Television receiver 150 may include home automation engine 211, as detailed in relation to FIG. 2.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170a represents a signal between satellite transmitter equipment 120 and satellite 130a. Uplink signal 170b represents a signal between satellite transmitter equipment 120 and satellite 130b. Each of uplink signals 170 may contain streams of one or more different television channels. For example, uplink signal 170a may contain a first group of television channels, while uplink signal 170b contains a second group of television channels. Each of these television channels may be scrambled such that unauthorized persons are prevented from accessing the television channels.

Downlink signal 180a represents a signal between satellite 130a and satellite dish 140. Downlink signal 180b represents a signal between satellite 130b and satellite dish 140. Each of downlink signals 180 may contain one or more different television channels, which may be at least partially scrambled. A downlink signal may be in the form of a transponder stream. A single transponder stream may be tuned to at a given time by a tuner of a television receiver. For example, downlink signal 180a may be a first transponder stream containing a first group of television channels, while downlink signal 180b may be a second transponder stream containing a different group of television channels. In addition to or instead of containing television channels, a transponder stream can be used to transmit on-demand content to television receivers, including PPV content, which may be stored locally by the television receiver until output for presentation.

FIG. 1 illustrates downlink signal 180a and downlink signal 180b, being received by satellite dish 140 and distributed to television receiver 150. For a first group of television channels, satellite dish 140 may receive downlink signal 180a and for a second group of channels, downlink signal 180b may be received. Television receiver 150 may decode the received transponder streams. As such, depending on which television channels are desired to be presented or stored, various transponder streams from various satellites may be received, descrambled, and decoded by television receiver 150.

Network 190, which may include the Internet, may allow for bidirectional communication between television receiver 150 and television service provider system 110, such as for home automation related services provided by home automation service server 112. Although illustrated as part of the television service provider system, the home automation service server 112 may be provided by a third party in embodiments. In addition or in alternate to network 190, a telephone, e.g., landline, or cellular connection may be used to enable communication between television receiver 150 and television service provider system 110.

FIG. 2 illustrates an embodiment of a television receiver 200, which may represent television receiver 150 of FIG. 1. Television receiver 200 may be configured to function as a host for a home automation system either alone or in conjunction with a communication device. Television receiver 200 may be in the form of a separate device configured to be connected with a display device, such as a television. Embodiments of television receiver 200 can include set-top boxes (STBs). In addition to being in the form of an STB, a television receiver may be incorporated as part of another device, such as a television, other form of display device, video game console, computer, mobile phone or tablet, or the like. For example, a television may have an integrated television receiver, which does not involve an external STB being coupled with the television.

Television receiver 200 may be incorporated as part of a television, such as display device 160 of FIG. 1. Television receiver 200 may include: processors 210, which may include control processor 210a, tuning management processor 210b, and possibly additional processors, tuners 215, network interface 220, non-transitory computer-readable storage medium 225, electronic programming guide (EPG) database 230, television interface 235, digital video recorder (DVR) database 245, which may include provider-managed television programming storage and/or user-defined television programming, on-demand programming database 227, home automation settings database 247, home automation script database 248, remote control interface 250, security device 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210b. Further, functionality of components may be spread among additional components.

Processors 210 may include one or more specialized and/or general-purpose processors configured to perform processes such as tuning to a particular channel, accessing and displaying EPG information from EPG database 230, and/or receiving and processing input from a user. It should be understood that the functions performed by various modules of FIG. 2 may be performed using one or more processors. As such, for example, functions of descrambling engine 265 may be performed by control processor 210a.

Control processor 210a may communicate with tuning management processor 210b. Control processor 210a may control the recording of television channels based on timers stored in DVR database 245. Control processor 210a may also provide commands to tuning management processor 210b when recording of a television channel is to cease. In addition to providing commands relating to the recording of television channels, control processor 210a may provide commands to tuning management processor 210b that indicate television channels to be output to decoder module 233 for output to a display device. Control processor 210a may also communicate with network interface 220 and remote control interface 250. Control processor 210a may handle incoming data from network interface 220 and remote control interface 250. Additionally, control processor 210a may be configured to output data via network interface 220.

Control processor 210a may include home automation engine 211. Home automation engine 211 may permit television receiver and control processor 210a to provide home automation functionality. Home automation engine 211 may have a JSON (JavaScript Object Notation) command interpreter or some other form of command interpreter that is configured to communicate with wireless devices via network interface 220 and a message server, possibly via a message server client. Such a command interpreter of home automation engine 211 may also communicate via a local area network with devices without using the Internet. Home automation engine 211 may contain multiple controllers specific to different protocols; for instance, a ZigBee® controller, a Z-Wave® controller, and/or an IP camera controller, wireless LAN, 802.11, may be present. Home automation engine 211 may contain a media server configured to serve streaming audio and/or video to remote devices on a local area network or the Internet. Television receiver may be able to serve such devices with recorded content, live content, and/or content recorded using one or more home automation devices, such as cameras.

Tuners 215 may include one or more tuners used to tune to transponders that include broadcasts of one or more television channels. Such tuners may be used also to receive for storage on-demand content and/or addressable television commercials. In some embodiments, two, three, or more than three tuners may be present, such as four, six, or eight tuners. Each tuner contained in tuners 215 may be capable of receiving and processing a single transponder stream from a satellite transponder or from a cable network at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210*b*. Such commands may instruct tuners 215 to which frequencies are to be tuned.

Network interface 220 may be used to communicate via an alternate communication channel with a television service provider, if such communication channel is available. A communication channel may be via satellite, which may be unidirectional to television receiver 200, and the alternate communication channel, which may be bidirectional, may be via a network, such as the Internet. Data may be transmitted from television receiver 200 to a television service provider system and from the television service provider system to television receiver 200. Information may be transmitted and/or received via network interface 220. For instance, instructions from a television service provider may also be received via network interface 220, if connected with the Internet. Besides the primary communication channel being satellite, cable network, an IP-based network, or broadcast network may be used. Network interface 220 may permit wireless communication with one or more types of networks, including using home automation network protocols and wireless network protocols. Also, wired networks may be connected to and communicated with via network interface 220. Device interface 221 may represent a USB port or some other form of communication port that permits communication with a communication device as will be explained further below.

Storage medium 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information related to on-demand programming database 227, EPG database 230, DVR database 245, home automation settings database 247, and/or home automation script database 248. Recorded television programs may be stored using storage medium 225 as part of DVR database 245. Storage medium 225 may be partitioned or otherwise divided, such as into folders, such that predefined amounts of storage medium 225 are devoted to storage of television programs recorded due to user-defined timers and stored television programs recorded due to provider-defined timers.

Home automation settings database 247 may allow configuration settings of home automation devices and user preferences to be stored. Home automation settings database 247 may store data related to various devices that have been set up to communicate with television receiver 200. For instance, home automation settings database 247 may be configured to store information on which types of events should be indicated to users, to which users, in what order, and what communication methods should be used. For instance, an event such as an open garage may only be notified to certain wireless devices, e.g., a cellular phone associated with a parent, not a child, notification may be by a third-party notification server, email, text message, and/or phone call. In some embodiments, a second notification method may only be used if a first fails. For instance, if a notification cannot be sent to the user via a third-party notification server, an email may be sent.

Home automation settings database 247 may store information that allows for the configuration and control of individual home automation devices which may operate using Z-wave® and ZigBee®—specific protocols. To do so, home automation engine 211 may create a proxy for each device that allows for settings for the device to be passed through a UI, e.g., presented on a television, to allow for settings to be solicited for and collected via a user interface presented by television receiver or overlay device. The received settings may then be handled by the proxy specific to the protocol, allowing for the settings to be passed on to the appropriate device. Such an arrangement may allow for settings to be collected and received via a UI of the television receiver or overlay device and passed to the appropriate home automation device and/or used for managing the appropriate home automation device. For example, a piece of exercise equipment that is enabled to interface with the home automation engine 211, such as via device interface 221, may be configured at the electronic device 211 in addition to on the piece of exercise equipment itself. Additionally, a mobile device or application residing on a mobile device and utilized with exercise equipment may be configured in such a fashion as well for displaying received fitness information on a coupled display device.

Home automation script database 248 may store scripts that detail how home automation devices are to function based on various events occurring. For instance, if stored content starts being played back by television receiver 200, lights in the vicinity of display device 160 may be dimmed and shades may be lowered by communicatively coupled and controlled shade controller. As another example, when a user shuts programming off late in the evening, there may be an assumption the user is going to bed. Therefore, the user may configure television receiver 200 to lock all doors via a lock controller, shut the garage door via garage controller, lower a heat setting of thermostat, shut off all lights via a light controller, and determine if any windows or doors are open via window sensors and door sensors, and, if so, alert the user. Such scripts or programs may be predefined by the home automation/television service provider and/or may be defined by a user.

In some embodiments, home automation script database 248 may allow for various music profiles to be implemented. For instance, based on home automation settings within a structure, appropriate music may be played. For instance, when a piece of exercise equipment is connected or is used, energizing music may be played. Conversely, based on the music being played, settings of home automation devices may be determined. If television programming, such as a movie, is output for playback by television receiver 150, a particular home automation script may be used to adjust home automation settings, e.g., lower lights, raise temperature, and lock doors.

EPG database 230 may store information related to television channels and the timing of programs appearing on such television channels. EPG database 230 may be stored using storage medium 225, which may be a hard drive or solid-state drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220, via satellite, or some other communication link with a television service provider, e.g., a cable network. Updates to EPG database 230 may be received periodically. EPG database 230 may serve as an interface for a user to control DVR functions of television receiver 200, and/or to enable viewing and/or recording of multiple television channels simultaneously. EPG database 240 may also contain information about on-demand content or any other form of accessible content.

Decoder module 233 may serve to convert encoded video and audio into a format suitable for output to a display device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265, simultaneously. For instance, decoders within decoder module 233 may be able to only decode a single television channel at a time. Decoder module 233 may have various numbers of decoders.

Television interface 235 may serve to output a signal to a television or another form of display device in a proper format for display of video and playback of audio. As such, television interface 235 may output one or more television channels, stored television programming from storage medium 225, e.g., television programs from DVR database 245, television programs from on-demand programming 230 and/or information from EPG database 230, to a television for presentation. Television interface 235 may also serve to output a CVM.

Digital Video Recorder (DVR) functionality may permit a television channel to be recorded for a period of time. DVR functionality of television receiver 200 may be managed by control processor 210a. Control processor 210a may coordinate the television channel, start time, and stop time of when recording of a television channel is to occur. DVR database 245 may store information related to the recording of television channels. DVR database 245 may store timers that are used by control processor 210a to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created; one for each television channel. Within each file, one or more television programs may be present. The service provider may define the television channels, the dates, and the time periods for which the television channels are recorded for the provider-defined timers. The provider-defined timers may be transmitted to television receiver 200 via the television provider's network. For example, in a satellite-based television service provider system, data necessary to create the provider-defined timers at television receiver 150 may be received via satellite.

On-demand programming database 227 may store additional television programming. On-demand programming database 227 may include television programming that was not recorded to storage medium 225 via a timer, either user- or provider-defined. Rather, on-demand programming may be programming provided to the television receiver directly for storage by the television receiver and for later presentation to one or more users. On-demand programming may not be user-selected. As such, the television programming stored to on-demand programming database 227 may be the same for each television receiver of a television service provider. On-demand programming database 227 may include pay-per-view (PPV) programming that a user must pay and/or use an amount of credits to view. For instance, on-demand programming database 227 may include movies that are not available for purchase or rental yet.

Referring back to tuners 215, television channels received via satellite or cable may contain at least some scrambled data. Packets of audio and video may be scrambled to prevent unauthorized users, e.g., nonsubscribers, from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which can be determined to be associated with a particular television channel. Particular data packets, referred to as entitlement control messages (ECMs), may be periodically transmitted. ECMs may be associated with another PID and may be encrypted; television receiver 200 may use decryption engine 261 of security device 260 to decrypt ECMs. Decryption of an ECM may only be possible if the user has authorization to access the particular television channel associated with the ECM. When an ECM is determined to correspond to a television channel being stored and/or displayed, the ECM may be provided to security device 260 for decryption.

When security device 260 receives an encrypted ECM, security device 260 may decrypt the ECM to obtain some number of control words. In some embodiments, from each ECM received by security device 260, two control words are obtained. In some embodiments, when security device 260 receives an ECM, it compares the ECM to the previously received ECM. If the two ECMs match, the second ECM is not decrypted because the same control words would be obtained. In other embodiments, each ECM received by security device 260 is decrypted; however, if a second ECM matches a first ECM, the outputted control words will match; thus, effectively, the second ECM does not affect the control words output by security device 260. Security device 260 may be permanently part of television receiver 200 or may be configured to be inserted and removed from television receiver 200, such as a smart card, cable card, or the like.

Tuning management processor 210b may be in communication with tuners 215 and control processor 210a. Tuning management processor 210b may be configured to receive commands from control processor 210a. Such commands may indicate when to start/stop receiving and/or recording of a television channel and/or when to start/stop causing a television channel to be output to a television. Tuning management processor 210b may control tuners 215. Tuning management processor 210b may provide commands to tuners 215 that instruct the tuners which satellite, transponder, and/or frequency to tune to. From tuners 215, tuning management processor 210b may receive transponder streams of packetized data.

Descrambling engine 265 may use the control words output by security device 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by security device 260 to be used for successful descrambling may be indicated by a scramble control identifier present within the data packet containing the scrambled video or audio. Descrambled video and/or audio may be output by descrambling engine 265 to storage medium 225 for storage, in DVR database 245, and/or to decoder module 233 for output to a television or other presentation equipment via television interface 235.

In some embodiments, the television receiver 200 may be configured to periodically reboot in order to install software updates downloaded over the network 190 or satellites 130. Such reboots may occur for example during the night when the users are likely asleep and not watching television. If the system utilizes a single processing module to provide television receiving and home automation functionality, then the security functions may be temporarily deactivated. In order to increase the security of the system, the television receiver 200 may be configured to reboot at random times during the night in order to allow for installation of updates. Thus, an intruder is less likely to guess the time when the system is rebooting. In some embodiments, the television receiver 200 may include multiple processing modules for providing different functionality, such as television receiving functionality and home automation, such that an update to one module does not necessitate reboot of the whole system. In other embodiments, multiple processing modules may be made available as a primary and a backup during any installation or update procedures.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer system 700 of FIG. 7.

While the television receiver 200 has been illustrated as a satellite-based television receiver, it is to be appreciated that techniques below may be implemented in other types of television receiving devices, such a cable receivers, terrestrial receivers, IPTV receivers or the like. In some embodiments, the television receiver 200 may be configured as a hybrid receiving device, capable of receiving content from disparate communication networks, such as satellite and terrestrial television broadcasts. In some embodiments, the tuners may be in the form of network interfaces capable of receiving content from designated network locations. The home automation functions of television receiver 200 may be performed by an overlay device. If such an overlay device is used, television programming functions may still be provided by a television receiver that is not used to provide home automation functions.

Figure 3:
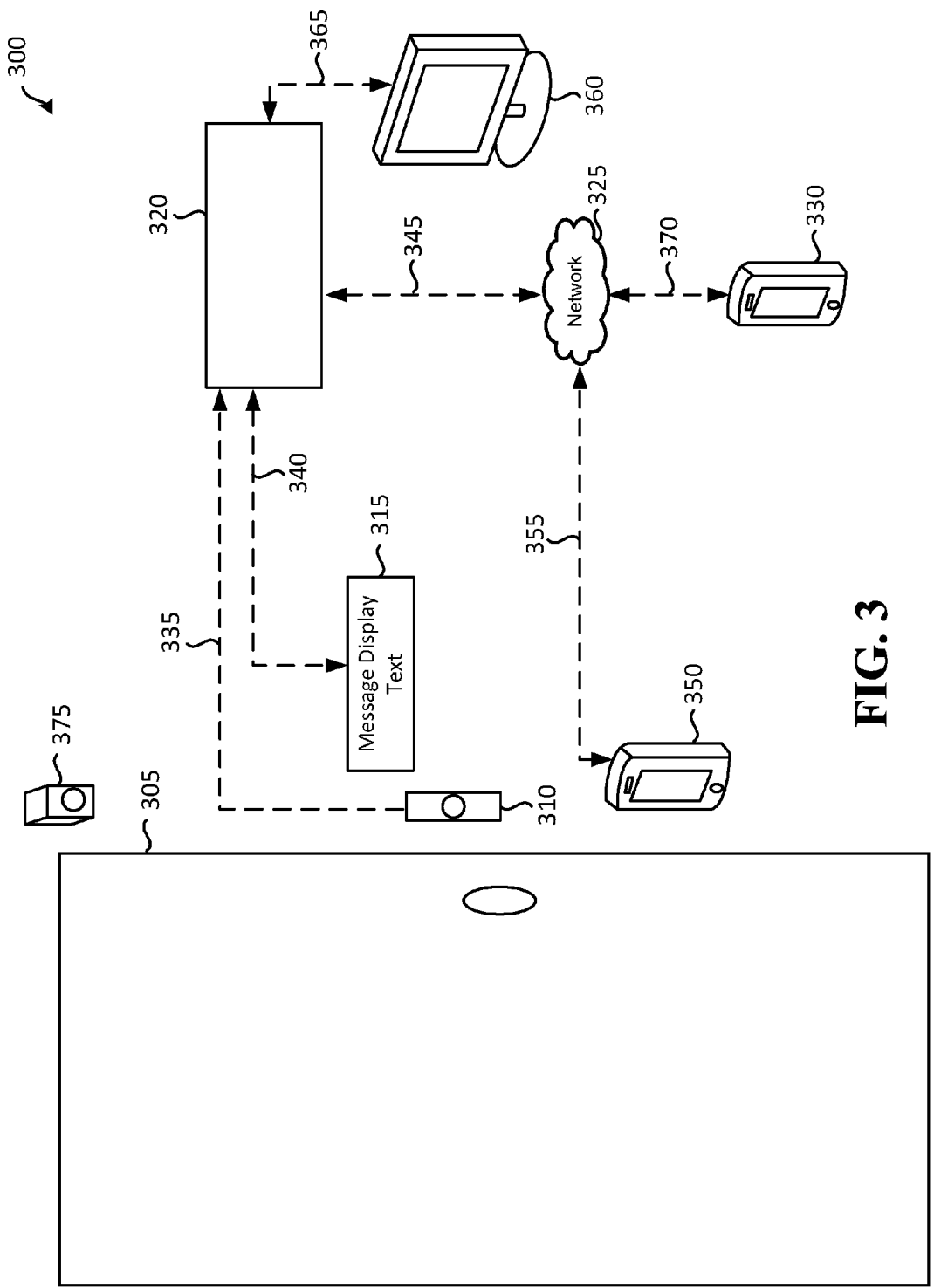
FIG. 3 illustrates a simplified block diagram of an outdoor messaging display system.

FIG. 3 illustrates a simplified block diagram of an outdoor messaging display system 300. The system includes a door 305, a doorbell 310, a camera 375, a display device 315, a controller 320, a resident device 330, communication paths 335, 340, 345, 355, 365, and 370, visitor device 350, network 325, and television 360.

Controller 320 can be any controller that is suitable for controlling a home automation system or security system. Controller 320 can be, for example, television receiver 200 of FIG. 2. Optionally, controller 320 can control communication regarding the outdoor messaging system and the associated equipment described herein without controlling any other home automation or security systems. Optionally, controller 320 can control communication regarding any number of home automation and/or security components including the components for the outdoor messaging system as described herein, cameras, door sensors, glass breakage sensors, televisions, light switches and bulbs, components associated with various appliances of a household (e.g., refrigerators, furnaces, and so forth), or any other suitable component.

The display device 315 can be any suitable display device 315 including, for example, an LCD device, LED display device, plasma display device, or a CRT display device. The display device can be any device capable of displaying text including a smartphone, tablet, personal digital assistant, specialized device with a display as described above, or any other suitable display device. The display device 315 can be, for example, a repurposed electronic device of the resident such as, for example, a tablet or smartphone. Optionally, the display device 315 can have a touchscreen for receiving input or it can have other input components including, for example, a keyboard. Optionally, the display device 315 can be a wired or a wireless device for communication with the controller 320. The display device 315 can be powered with a battery, solar, an outlet, or any other suitable power source or any combination thereof. The display device 315 can be communicatively coupled to the controller 320 via communication path 340. Communication path 340 can be a wired connection and/or a wireless connection using, for example, Bluetooth®, ZigBee®, any of the IEEE 802.11 family of wireless protocols, or any other wireless protocol.

The door 305 can be an entrance to the premises or home and located next to the door 305 can be the doorbell 310. The doorbell 310 can be used by a visitor to notify the resident of his arrival. Optionally, the resident can be alerted to the presence of a visitor by a motion sensor which can be in camera 375 located near the door or by a proximity sensor (not pictured) located near the door 305. The display device 315 can also be located near the door 305 and doorbell 310. Optionally, the display device 315 can be mounted to the premises near the door 305.

The doorbell 310 can be communicatively coupled to the controller 320 through a wired connection and/or through a wireless connection using, for example, Bluetooth®, ZigBee®, any of the IEEE 802.11 family of wireless protocols, or any other wireless protocol. Doorbell 310 can be any suitable doorbell for announcing a visitor's arrival that can communicate with controller 320.

The camera 375 can be communicatively coupled to the controller 320 through a wired connection and/or through a wireless connection using, for example, Bluetooth®, ZigBee®, any of the IEEE 802.11 family of wireless protocols, or any other wireless protocol. Camera 375 can be any suitable camera used with a home automation and/or security system. Camera 375 can include a motion detector (not shown). Optionally, camera 375 can typically remain in a sleep mode to conserve power and the motion detector can detect motion of a visitor, which can trigger camera 375 to activate out of sleep mode. Optionally, upon detection of motion, camera 375 can send a notification to controller 320 of the presence of a visitor.

Resident device 330 can be any mobile device or other device of the resident that allows communication and alerts from the controller 320. For example, resident device 330 can be a smartphone, tablet, smart watch, or any other suitable mobile device. Optionally, resident device 330 can be any network capable communication device, including a laptop computer or any other computing device. Resident device 330 can optionally have the ability to communicate via voice through a network, such as a cellular connection. Resident device 330 can optionally have the ability to communicate via any other suitable network including the Internet, Bluetooth®, and so forth. Resident device 330 can optionally have the ability to communicate via text communication (e.g., SMS), voice communication, and data communication (e.g., 4G). Visitor device 350 can have similar functionality as described with respect to resident device 330.

Resident device 330 can communicate with controller 320 via network 325 and communication paths 345 and 370. Network 325 can be the same or similar to network 190 of FIG. 1. Resident device can communicate with controller 320 via network 325 and communication paths 355 and 345.

Television 360 can be any television communicatively coupled with controller 320. Television 360 can be a television with any type of display including a CRT display, LCD, LED display, or plasma display. Television 365 can be communicatively coupled to controller 320 through a wired connection and/or through a wireless connection using, for example, Bluetooth®, ZigBee®, any of the IEEE 802.11 family of wireless protocols, or any other wireless protocol.

In use, a visitor can arrive at a premises having outdoor messaging display system 300. The visitor can ring doorbell 310 upon arrival at door 305. The ringing of the doorbell 310 can send a notification via communication path 335 to controller 320. Optionally, if the visitor does not ring doorbell 310 or prior to ringing doorbell 310, the notification that a visitor has arrived can be sent to controller 320 by a proximity sensor or a motion sensor as discussed above.

Upon receipt of the notification of a visitor, controller 320 can send an alert to the resident. The alert can be sent to, for example, resident device 330 via communication paths 345 and 370 through network 325. Instead, or in addition, the alert can be sent to the television 360 via communication path 365. The television 360 and or resident device 330 can display the alert to the resident. Optionally, the alert can be sent to one or more devices based on a configuration that can be set through a user interface of the controller 320 via, for example, a user interface on television 360 or through the resident device application described in more detail with respect to FIG. 4B. Optionally, the controller 320 can send the alert to multiple devices (e.g., television 360 and resident device 330) at the same time. Optionally, the controller 320 can send the alert to a first device (e.g., television 360) as configured at the controller 320 and if that device is off or unresponsive, home automation controller can send the alert to a second device (e.g., resident device 330). That process can continue until no further devices are configured to which the controller 320 can send the alert. The configuration of the devices can be through, for example, the user interface described with respect to home automation settings database 247. The configuration settings can be stored in a database such as home automation settings database 247. Such configuration can include providing device information, including information needed for communication (e.g., a phone number) and a ranking of the device for ordering which device receives the alert first, second, and so forth.

Upon receipt of the alert, the resident can, for example, click the alert to launch an application that can be used to send text for display on display device 315. For example, the application can be the application described in more detail with respect to FIGS. 4A and 4B. Within the application on the resident device 330 or television 360, the resident can create a text message or select a predefined text message and send it to the controller 320. The message can be sent to controller 320 from television 360 via communication path 365 or from resident device 330 via network 325 and communication paths 345 and 370.

Optionally, upon receipt of the alert, a widget installed on the resident device can allow the alert to be shown and a single-touch can be utilized for quick response. For example, the widget can sync with the controller and allow for a predefined quick response that can be preconfigured to send the predefined message to the controller based on a single-touch of the widget in response to the alert.

Upon receipt of the message, controller 320 can send an instruction to display device 315 to display the message via communication path 340. Optionally, the controller 320 can instruct the display device 315 to modify the display to ensure the visitor notices the text. For example, the controller 320 can instruct the display device 315 to flash the text multiple times to catch the visitor's attention. As other examples, the controller 320 can instruct the display device 315 to display the message in bold, in all capital letters, or in a bright color.

Optionally, the display device can include a keyboard to allow the visitor to respond to the message. For example, a hardware keyboard can be included on display device 315. As another example, a software keyboard on the display can allow the visitor to enter a message. The message entered by the visitor can be sent to controller 320 via communication path 340. The controller 320 can send the visitor's message to the resident device 330 and/or television 360 for display to the resident. This process of exchanging messages can continue until either the resident or the visitor stops the communication.

Optionally, the message displayed on display device 315 can include a coupling code. The coupling code can allow the visitor to utilize visitor device 350 to communicate with the resident. The coupling code can be, for example, a number to which the visitor can text an opt-in message. The opt-in message can be, for example, "yes." The opt-in message sent to the text number can cause a message to arrive at home-automation controller 320 that allows the visitor device 350 to communicate with controller 320 via network 325 and communication paths 355 and 345. Upon opt-in, the messages from the resident can be sent directly to visitor device 350 rather than or in addition to display device 315. The opt-in can be temporary, such that upon expiration of 5 minutes, messages from the resident through the controller 320 no longer are sent to visitor device 350. The text number can then be reused by future visitors. Optionally, a new or random text number can be generated and sent to the display device 315 for each visitor. Optionally, the coupling code can be a Bluetooth confirmation code that the visitor can use to couple the visitor device 350 to controller 320.

After the exchange of messages, the controller 320 can decouple the visitor device 350.

Optionally, a microphone (not shown) or a microphone included in camera 375 can receive sound, which can be sent to the controller 320. If the visitor speaks, the voice communication can be sent to the controller 320. Controller 320 can send the voice communication along with any images or video to resident device 330 or television 360, allowing the visitor to communicate with the resident.

Figure 4A:
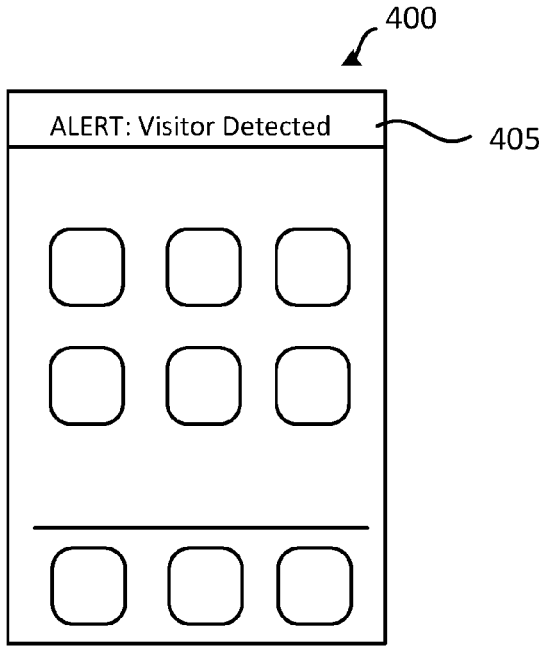
FIG. 4A illustrates a diagram of an example resident device notification for use with an outdoor messaging display system.

FIG. 4A illustrates a diagram of an example resident device display 400 showing a notification 405 for use with an outdoor messaging display for a home automation system, such as system 300 of FIG. 3.

The resident device display 400 can be displayed on, for example, resident device 330 of FIG. 3. Optionally, resident device display 400 can be displayed on, for example, television 360 of FIG. 3. The alert 405 can appear at the top of the resident device display 400 as shown in FIG. 4A. Optionally, the alert 405 can appear anywhere on resident device display 400, including at the bottom, on the side, or in the middle.

The alert 405 can be any suitable notification to alert the resident that a visitor has been detected. Optionally, the alert 405 can be displayed in bold or a bright color to capture the attention of the resident. Optionally, the alert 405 can be accompanied by a sound to capture the attention of the resident. Optionally, the alert 405 can be configured through the user interface described with respect to home automation settings database 247 and instructions sent with the message for display. Optionally, the configuration can be through the alert application on the resident device.

Figure 4B:
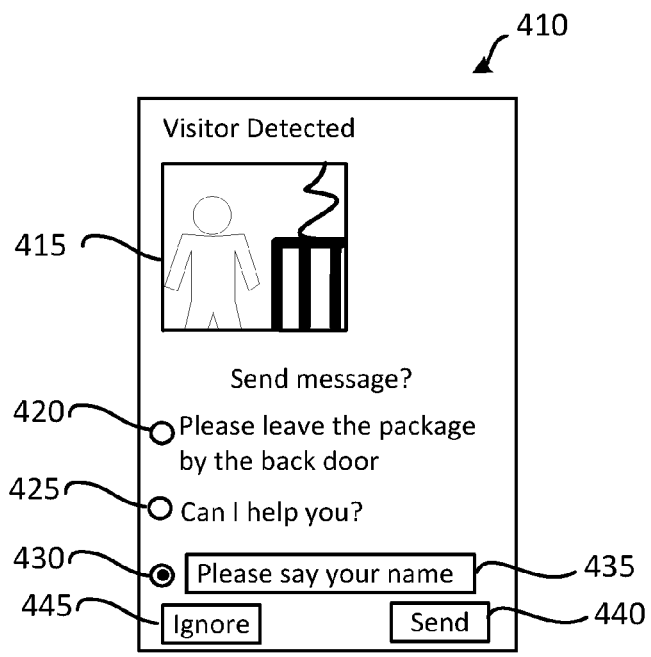
FIG. 4B illustrates a diagram of an example resident device application interface for use with an outdoor messaging display system.

Upon receipt of the alert 405, the resident can, for example, select or click on the alert to launch an application to gain more information about the visitor such as the application described in more detail in FIG. 4B. FIG. 4B illustrates an application 410 that can be displayed on resident device display 400 after selection of the alert 405. The application can include an image or video feed 415 of the visitor, one or more predefined responses 420 and 425, a custom response radio button 430 and associated custom response text box 435, an ignore button 445, and a send button 440.

Image or video feed 415 can be captured by a camera (e.g., camera 375) located near the door of the premises, which can be part of the home automation or security system. The camera can send the image or video feed 415 to the controller (e.g., controller 320) and the controller can send the image or video feed 415 to the resident device for display in the application 410. The image or video feed 415 can help the resident determine whether the resident knows the visitor. Optionally, the camera can include a microphone so that sound can also be sent from the controller to the resident device and heard through a speaker of the resident device.

The application 410 can include one or more predefined responses 420 and 425. As an example, FIG. 4B shows that predefined response 420 says "Please leave the package by the back door," which may be used to alert delivery persons quickly of a different location for package delivery. As another example, predefined message 425 says "Can I help you?" which may be used for any visitor. Any predefined message 420 and 425 includes an associated radio button for selection of the predefined message 420 or 425. Optionally, any number of predefined messages can be available to the resident within application 410. Optionally, instead of a radio button selection, a dropdown list of predefined responses can be available for selection of one. Any suitable selection method can be used for selection of a predefined response. Other examples of predefined responses include "please say/enter your name," "no thanks, I'm not interested," "I'm busy right now, but thanks for stopping by," or "No Soliciting."

Radio button 430 can allow selection of the associated custom message text box 435. This selection can allow the resident to type a custom message into the text box 435 for sending to the display device for the visitor to read. As an example, the resident can type in "please say your name" as shown in FIG. 4B. When the display device displays the message text, the visitor can say his or her name. A microphone, for example, in a camera that is part of the system (e.g., camera 375 of FIG. 3) can receive the visitor's voice and send the sound to the controller.

Optionally, to deter potential criminal activity, the system can include a speaker that is near the interior of the door. If after determining that the visitor may be a dangerous visitor, to discourage unwanted entry by the visitor, a predefined option can include sending a message to play a recorded voice through the speaker, suggesting someone is home but unavailable to answer the door. Such a voice recording can be heard through the door and alert the unwanted visitor that a resident may be present, which can discourage possible criminal activity.

After selection of either a predefined response 420 or 425 or selection of custom radio button 430 and entry of a message into custom response text box 435, the send button 440 can send the selected response to the controller. The controller can send an instruction to the display device (e.g., display device 315) to display the selected response to the visitor, as described in more detail with respect to FIG. 3. The controller can, optionally, include with the response additional information for display including a coupling code as described in more detail with respect to FIG. 3. Optionally, the application 415 can provide an option, such as a checkbox, to allow the resident to select whether the controller should send instructions to display the coupling code information.

Ignore button 445 can be selected by the resident to ignore the visitor. If selected, a message can be sent to the controller that instructs the controller to ignore the visitor. If configured to send the alert to other devices in a ranked order, selection of the ignore button can instruct the controller to not send the alert to the other devices further down the ranked list. Optionally, though not shown, a pass button can be displayed next to the ignore button 445 that can allow the resident to pass the alert to the next device in the ranked list of devices.

Figure 5:
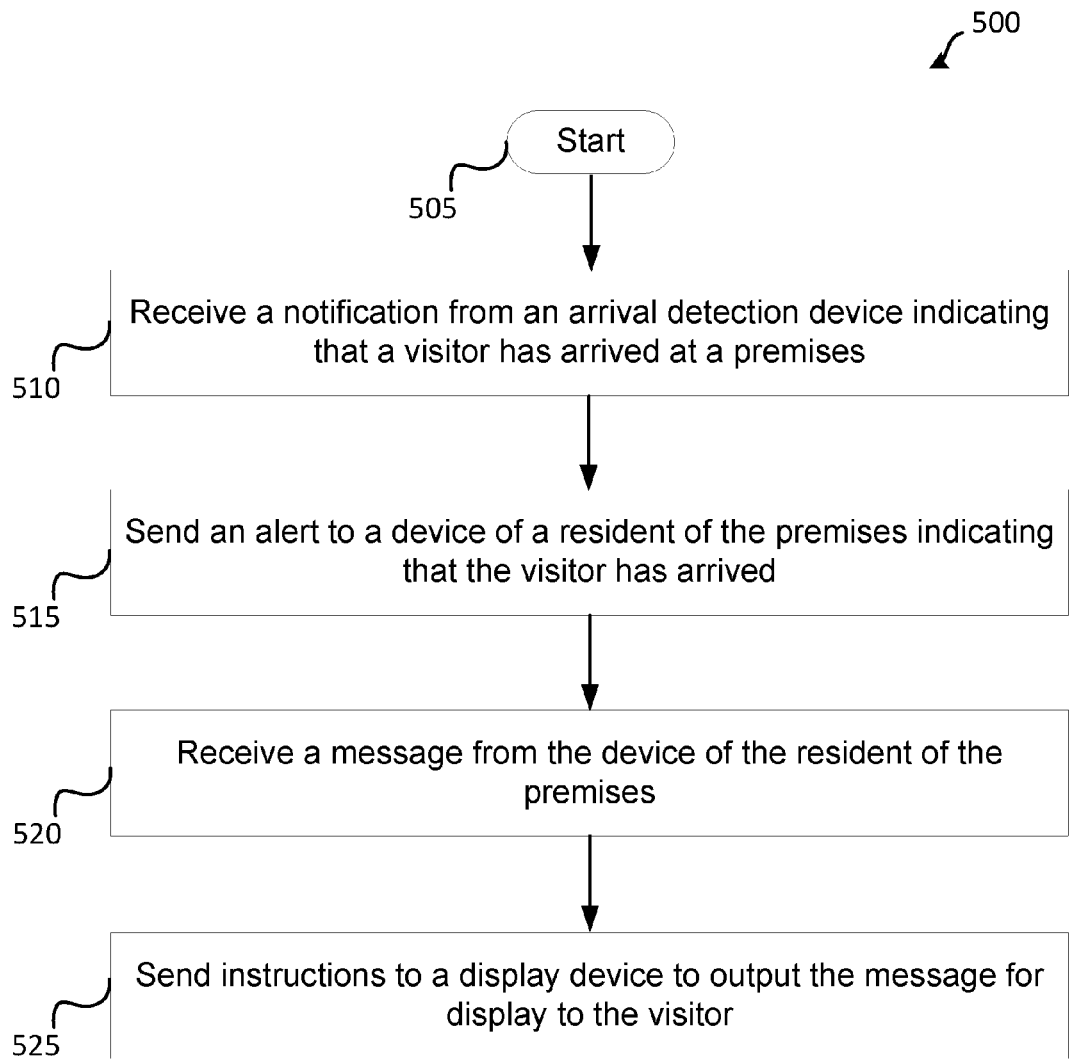
FIG. 5 illustrates a method of providing an outdoor messaging display system.

FIG. 5 illustrates a method 500 of providing an outdoor messaging display for a home automation system. Method 500 can be performed by, for example, controller 320 of FIG. 3. The method 500 begins at 505. At 510, the controller (e.g., controller 320) for the home automation or security system can receive a notification from an arrival detection device indicating that a visitor has arrived at a premises. Optionally the premises can be a home or a business. The arrival detection device can be, for example, doorbell 310 or a motion sensor in camera 375 of FIG. 3.

At 515, the controller can send an alert to a device of a resident of the premises indicating that the visitor has arrived. The alert can be the alert 405 of FIG. 4A.

At 520, the controller can receive a message the device of the resident. The message can be a predefined message or a custom message, as discussed in more detail with respect to FIG. 4B. Optionally, the message can include a selection for allowing the visitor to receive a coupling code for use with the visitor's device. Optionally, the message can instruct the controller to ignore the visitor or pass the alert on to the next device in a ranked listing of devices for alerting.

At 525, the controller can send instructions to a display device to output the message for display to the visitor. The instructions can include the message selected by the resident and can optionally include a coupling code for visitor to use to couple the visitor device and allow communication between the resident device and the visitor device. The use of a coupling code can allow the communication while protecting the resident from providing the resident's number to the visitor. Upon receipt of the message, the display device can display the text to the visitor.

Figure 6:
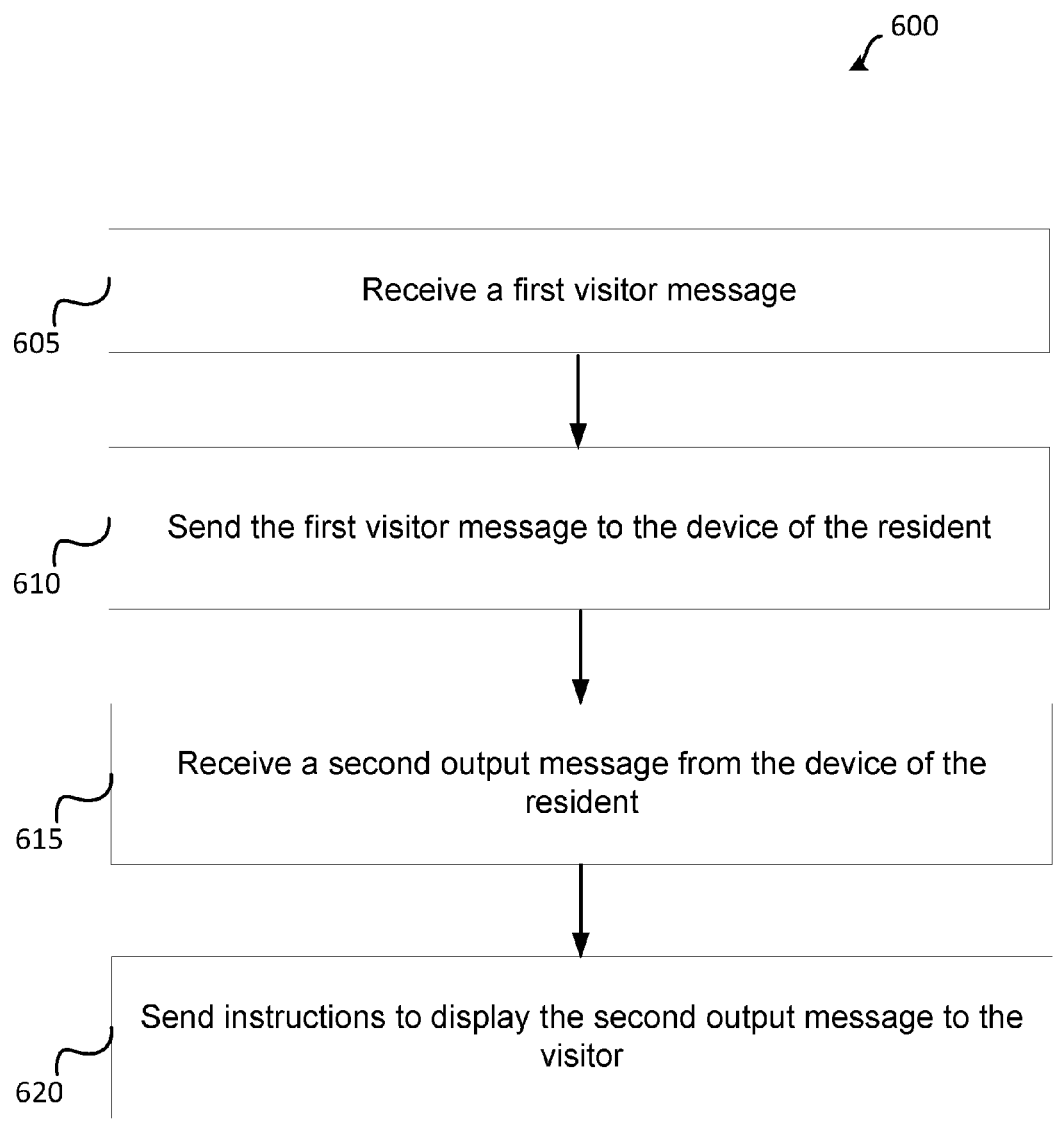
FIG. 6 illustrates another method of providing an outdoor messaging display system.

FIG. 6 illustrates another method 600 of providing an outdoor messaging display for a home automation system. Method 600 can be performed in addition to method 500 of FIG. 5. Method 600 can be performed by a controller of a home automation or security system (e.g. controller 320).

At 605, the controller can receive a first visitor message. The visitor can provide a message through any of the systems previously described. For example, a keyboard (either software or hardware) of the display device can be used by the visitor to enter a message which can be sent to the controller. As another example, a microphone located near the display device can capture the visitor's voice and send it to the controller. As yet another example, a visitor device can be coupled to the system for sending messages to the controller from the visitor device. As yet another example, a camera located near the display device can capture the voice and video of the visitor and send it to the controller.

At 610, the controller can send the first visitor message to the resident device. The message, as described above, can be any type of message including a voice message, a text message, or a video message. At 615, the controller can receive a second output message from the resident device. The resident can, after receiving the first visitor message, respond with another message for display on the display device or on the visitor device. At 620, the controller can send the second output message to the display device or to the visitor device.

Figure 7:
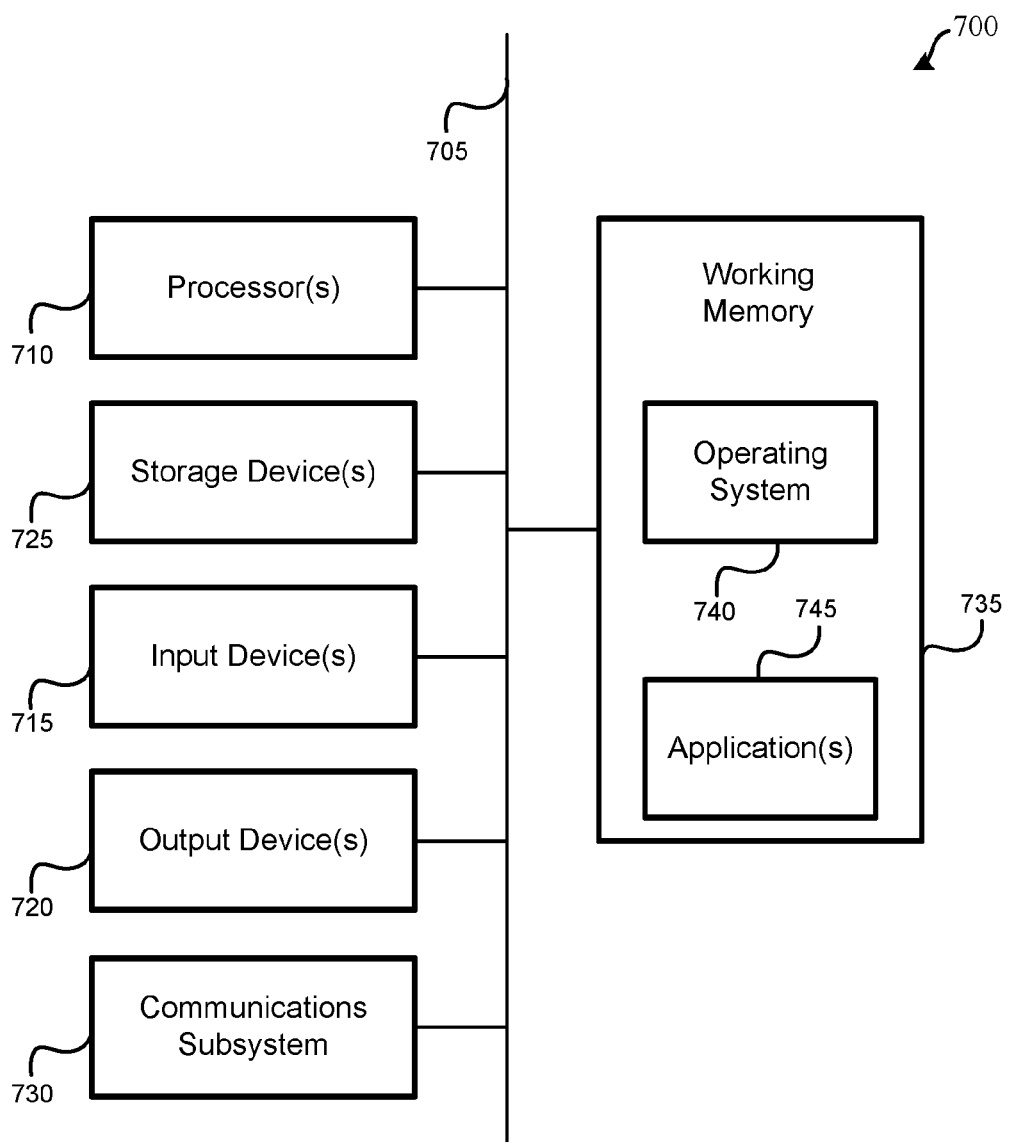
FIG. 7 illustrates an embodiment of a computer system.

FIG. 7 illustrates an embodiment of a computer system 700. A computer system 700 as illustrated in FIG. 7 may be incorporated into devices such as an STB (e.g., set-top box 200 of FIG. 2 and/or set-top box 310 of FIG. 3), a first electronic device, DVR, television, media system, personal computer, and the like. Moreover, some or all of the components of the computer system 700 may also be incorporated into a portable electronic device, mobile phone, or other device as described herein. FIG. 7 provides a schematic illustration of one embodiment of a computer system 700 that can perform some or all of the steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705, or may otherwise be in communication, as appropriate. The hardware elements may include one or more processors 710, including without limitation one or more general-purpose processors and/or one or more special-purpose processors such as digital signal processing chips, graphics acceleration processors, and/or the like; one or more input devices 715, which can include without limitation a mouse, a keyboard, a camera, and/or the like; and one or more output devices 720, which can include without limitation a display device, a printer, and/or the like.

The computer system 700 may further include and/or be in communication with one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 730 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 730. In other embodiments, a portable electronic device, e.g. the first electronic device, may be incorporated into the computer system 700, e.g., an electronic device or STB, as an input device 715. In many embodiments, the computer system 700 will further comprise a working memory 735, which can include a RAM or ROM device, as described above.

The computer system 700 also can include software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 5 or 6, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 725 described above. In some cases, the storage medium might be incorporated within a computer system, such as computer system 700. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 700 to perform methods in accordance with various embodiments of the technology. According to a set of embodiments, some or all of the procedures of such methods are performed by the computer system 700 in response to processor 710 executing one or more sequences of one or more instructions, which might be incorporated into the operating system 740 and/or other code, such as an application program 745, contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 and/or components thereof generally will receive signals, and the bus 705 then might carry the signals and/or the data, instructions, etc. carried by the signals to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A system, comprising:
an arrival detection device capable of detecting arrival of a visitor at a premises;
a display device attached to the premises at a door of the premises, the display device capable of displaying text to the visitor of the premises; and
a home automation controller, the home automation controller being communicatively coupled to the arrival detection device and the display device, the home automation controller comprising:
a processor; and
a memory having stored thereon instructions, which when executed by the processor, cause the processor to:
receive a notification from the arrival detection device indicating that a visitor has arrived at the premises;
send an alert to a device of a resident of the premises, the alert comprising an indication that the visitor has arrived at the premises;
receive a message from the device of the resident of the premises;
send instructions to the display device attached to the premises comprising an output message of text for display to the visitor based on the message received from the device of the resident of the premises, the output message of text including a coupling code, the coupling code comprising a number to which the visitor can text an opt-in message;
receive, from a mobile device of the visitor, the opt-in message using the coupling code;
receive, from the mobile device of the visitor, a first visitor message using the coupling code; and
transmit the first visitor message to the device of the resident of the premises.

2. The system of claim 1, wherein the memory of the home automation controller has stored thereon further instructions, which when executed by the processor, cause the processor to:
receive a second output message from the device of the resident; and
transmit the second output message to the mobile device of the visitor.

3. The system of claim 2, wherein the memory of the home automation controller has stored thereon further instructions, which when executed by the processor, cause the processor to:
in response to receiving the opt-in message using the coupling code, couple the mobile device of the visitor to the home automation controller; and
upon expiration of a threshold period of time, decouple the mobile device of the visitor from the home automation controller.

4. The system of claim 1, wherein the arrival detection device is one of a doorbell, a motion detector, and a proximity sensor.

5. The system of claim 1, wherein the display device is one of an LED display device, an LCD display device, and a plasma display device.

6. The system of claim 1, wherein the device of the resident is remote from the premises.

7. The system of claim 1, wherein the device of the resident is a television within the premises.

8. The system of claim 1, wherein the alert to the device of the resident comprises one or more predefined responses for selection by the resident to display as the output message.

9. The system of claim 1, wherein the alert to the device of the resident is sent via short message service (SMS).

10. The system of claim 1, wherein the display device comprises a keyboard, and wherein the memory of the home automation controller has stored thereon further instructions, which when executed by the processor, cause the processor to:
receive a second visitor message from the display device entered via the keyboard; and
transmit the second visitor message to the device of the resident.

11. A method, comprising:
receiving, at a controller, a notification from an arrival detection device indicating that a visitor has arrived at a premises;
sending, by the controller, an alert to a device of a resident of the premises, the alert comprising an indication that the visitor has arrived at the premises;
receiving, by the controller, a message from the device of the resident of the premises in response to the alert, the message comprising a message to display to the visitor;
sending instructions to a display device attached to the premises at a door of the premises, the instructions comprising an output message of text for display to the visitor based on the message received from the device of the resident of the premises, the output message of text including a coupling code, the coupling code comprising a number to which the visitor can text an opt-in message;
receive, from a mobile device of the visitor, the opt-in message using the coupling code;
receive, from the mobile device of the visitor, a first visitor message using the coupling code; and
transmit the first visitor message to the device of the resident of the premises.

12. The method of claim 11, further comprising:
receiving, by the controller, a second output message from the device of the resident; and
transmitting, by the controller, the second output message to the mobile device of the visitor.

13. The method of claim 12, further comprising:
in response to receiving the opt-in message using the coupling code, couple the mobile device of the visitor to the controller; and
upon expiration of a threshold period of time, decouple the mobile device of the visitor from the controller.

14. The method of claim 11, wherein the arrival detection device is one of a doorbell, a motion detector, and a proximity sensor.

15. The method of claim 11, wherein the display device is one of an LED display device, an LCD display device, and a plasma display device.

16. The method of claim 11, wherein the device of the resident is remote from the premises.

17. The method of claim 11, wherein the device of the resident is a television within the premises.

18. The method of claim 11, wherein the alert to the device of the resident comprises one or more predefined responses for selection by the resident to display as the output message.

19. The method of claim 11, wherein the alert to the device of the resident is sent via short message service (SMS).

20. The method of claim 11, wherein the display device comprises a keyboard, the method further comprising:
- receiving a second visitor message from the display device entered via the keyboard; and
- transmitting the second visitor message to the device of the resident.

\* \* \* \* \*